US008576669B2

(12) United States Patent
Onda

(10) Patent No.: US 8,576,669 B2
(45) Date of Patent: Nov. 5, 2013

(54) HOUR NOTIFICATION

(75) Inventor: Yoshihiro Onda, Tokyo (JP)

(73) Assignee: NEC Biglobe Ltd., Tokyo (JP)

( * ) Notice: Subject to any disclaimer, the term of this patent is extended or adjusted under 35 U.S.C. 154(b) by 230 days.

(21) Appl. No.: 13/064,875

(22) Filed: Apr. 22, 2011

(65) Prior Publication Data

US 2011/0286310 A1 Nov. 24, 2011

(30) Foreign Application Priority Data

May 19, 2010 (JP) ................................ 2010-115226

(51) Int. Cl.
G04B 47/06 (2006.01)
(52) U.S. Cl.
USPC .................................... 368/4; 368/13; 368/74
(58) Field of Classification Search
USPC ...................................... 368/47, 4, 13, 74, 46
See application file for complete search history.

(56) References Cited

U.S. PATENT DOCUMENTS

| | | | |
|---|---|---|---|
| 2003/0100323 A1* | 5/2003 | Tajima et al. | 455/502 |
| 2004/0021567 A1* | 2/2004 | Dunn | 340/539.13 |
| 2004/0190378 A1* | 9/2004 | Farmer | 368/47 |
| 2004/0220734 A1* | 11/2004 | Gronemeyer | 701/214 |
| 2006/0007788 A1* | 1/2006 | Cunningham | 368/73 |
| 2007/0063894 A1* | 3/2007 | Yu | 342/357.15 |
| 2008/0102786 A1* | 5/2008 | Griffin | 455/404.2 |
| 2009/0016170 A1* | 1/2009 | Tanaka | 368/46 |
| 2009/0140919 A1* | 6/2009 | Shingyoji | 342/357.12 |
| 2009/0180356 A1* | 7/2009 | Fujisawa | 368/47 |
| 2009/0271110 A1* | 10/2009 | Sugiura | 701/208 |
| 2010/0291950 A1* | 11/2010 | Lin et al. | 455/456.3 |
| 2011/0074558 A1 | 3/2011 | Miura | |

FOREIGN PATENT DOCUMENTS

| | | |
|---|---|---|
| JP | 10-197264 | 7/1998 |
| JP | 2002-293240 | 10/2002 |
| JP | 2002-330197 A | 11/2002 |
| JP | 2005-109957 A | 4/2005 |
| JP | 2005-109958 A | 4/2005 |
| JP | 2006-101292 A | 4/2006 |
| JP | 2006-319472 A | 11/2006 |
| WO | WO 2009/119777 A1 | 10/2009 |

OTHER PUBLICATIONS

Japanese Office Action dated Apr. 26, 2012, with partial English translation.
"Mobile Society Envisaged by DoCoMo", 4012th Regular Meeting, Feb. 20, 2004 (retrieved online on the Internet on Apr. 28, 2010) <URL:http://www.osaka-rc.org/html/speech/speech_20040220.htm>.

* cited by examiner

Primary Examiner — Amy Cohen Johnson
Assistant Examiner — Matthew Powell
(74) Attorney, Agent, or Firm — McGinn IP Law Group, PLLC

(57) ABSTRACT

A position information acquisition section acquires position information about a mobile terminal, and a storage section stores hour information and position condition information inputted to an interface section in association with each other. When the hour shown by a clock becomes the hour indicated by the hour information stored in the storage section, a comparison section compares the position condition information stored in association with the hour information, with the position information acquired by the position information acquisition section. If the position information corresponds to the position condition information as a result of the comparison, a notification section gives a notification.

25 Claims, 14 Drawing Sheets

Fig.3

| No. | hour information | position condition information | | | |
| --- | --- | --- | --- | --- | --- |
| | | latitude | longitude | distance range | inside/outside information |
| 1 | 6:30 | north latitude: ○○° ○○′ ○○″ | east longitude: △△° △△′ △△″ | 100m | inside |
| 2 | 7:00 | north latitude: □□° □□′ □□″ | east longitude: ××° ××′ ××″ | 100m | inside |
| 3 | — | — | — | — | — |

HOUR NOTIFICATION

This application is based upon and claims the benefit of priority from Japanese Patent Application No. 2010-115226 filed on May 19, 2010, the content of which is incorporated by reference.

TECHNICAL FILED

The present invention relates to a mobile terminal, an hour notification method and a program which notifies the hour.

BACKGROUND ART

Recently, mobile communication terminals, such as a mobile phone, are mounted with various functions, such as a clock function, an e-mail function, an Internet connection function, a photographing function, a current position display function and an alarm clock function (an hour notification function), in addition to a telephone function (for example, see Non Patent Literature 1).

Especially, statistics show that the number of users who use the alarm function built into such a mobile communication terminal as alarm means is larger than the number of users who use a common alarm clock as alarm means.

CITATION LIST

Non Patent Literature
[Non Patent Literature 1] "Mobile Society Envisaged by DoCoMo", 4012th Regular Meeting, Feb. 20, 2004 (retrieved online on the Internet on Apr. 28, 2010) <URL: http://www.osaka-rc.org/html/speech/speech_20040220.htm>

SUMMARY OF INVENTION

Technical Problem

However, the alarm clock function built into a commonly used mobile communication terminal gives a notification to the outside by a predetermined sound or the like when it reaches the set hour, and, in addition to the hour, the notification can be set to be repeated every day, one day of the week, the sound volume and kind of sound and the like that can be set.

For example, there may be cases in which the user does not want the alarm to go off at the time that it normally rings such as when he travels and wants to sleep late. In such a case, he has to change the hour set for the mobile communication terminal or change the mode so that the alarm does not ring.

Therefore, there is a problem which it is troublesome to make the change. Furthermore, there is a problem in which, if he fails to make the change, he is awakened at an early hour even though he does not want to be awoken at that hour during travel.

The object of the present invention is to provide a mobile terminal, an hour notification method and a program for solving the above problems.

Solution to Problem

The mobile terminal of the present invention is:
a mobile terminal provided with a clock, the mobile terminal comprising:
a position information acquisition section that acquires position information indicating the position of the mobile terminal at a predetermined timing;
an interface section that inputs information from the outside of the mobile terminal;
a storage section that stores hour information and position condition information inputted to the interface section in association with each other;
a comparison section that compares, when the hour shown by the clock becomes the hour indicated by the hour information stored in the storage section, the position condition information stored in the storage section in association with the hour information, with the position information acquired by the position information acquisition section; and
a notification section that causes a predetermined notification to be generated on the outside of the mobile terminal if the position information corresponds to the position condition information as a result of the comparison by the comparison section.

The hour notification method of the present invention is:
an hour notification method for causing notification, that the hour that has been set in advance has been reached, to be generated on the outside of a mobile terminal, the method comprising:
measuring time;
acquiring position information indicating the position of the mobile terminal at a predetermined timing;
storing hour information and the position condition information inputted from the outside of the mobile terminal in association with each other;
comparing, when the current hour becomes the hour indicated by the stored hour information, the position condition information stored in association with the hour information, with the acquired position information; and
causing a predetermined notification to be generated on the outside of the mobile terminal if the position information corresponds to the position condition information as a result of the comparison.

The recording medium of the present invention is:
a recording medium in which there is recorded a program to be executed by a computer, the program being for executing:
a procedure for measuring time;
a procedure for acquiring position information indicating the position of the computer at a predetermined timing;
a procedure for storing hour information and the position condition information inputted from the outside of the computer in association with each other;
a procedure for comparing, when the current hour becomes the hour indicated by the stored hour information, the position condition information stored in association with the hour information, with the acquired position information; and
a procedure for causing a predetermined notification to be generated on the outside of the computer if the position information corresponds to the position condition information as a result of the comparison.

Advantageous Effects of Invention

As described above, in the present invention, it is possible to give a more appropriate hour notification.

The above and other objects, features, and advantages of the present invention will become apparent from the following description with reference to the accompanying drawings which illustrate an example of the present invention.

BRIEF DESCRIPTION OF DRAWINGS

FIG. 3 is a diagram showing an example of association between hour information and position condition information stored in a storage section shown in FIG. 2;

DESCRIPTION OF EMBODIMENTS

An exemplary embodiment will be described below with reference to drawings.

Figure 1:
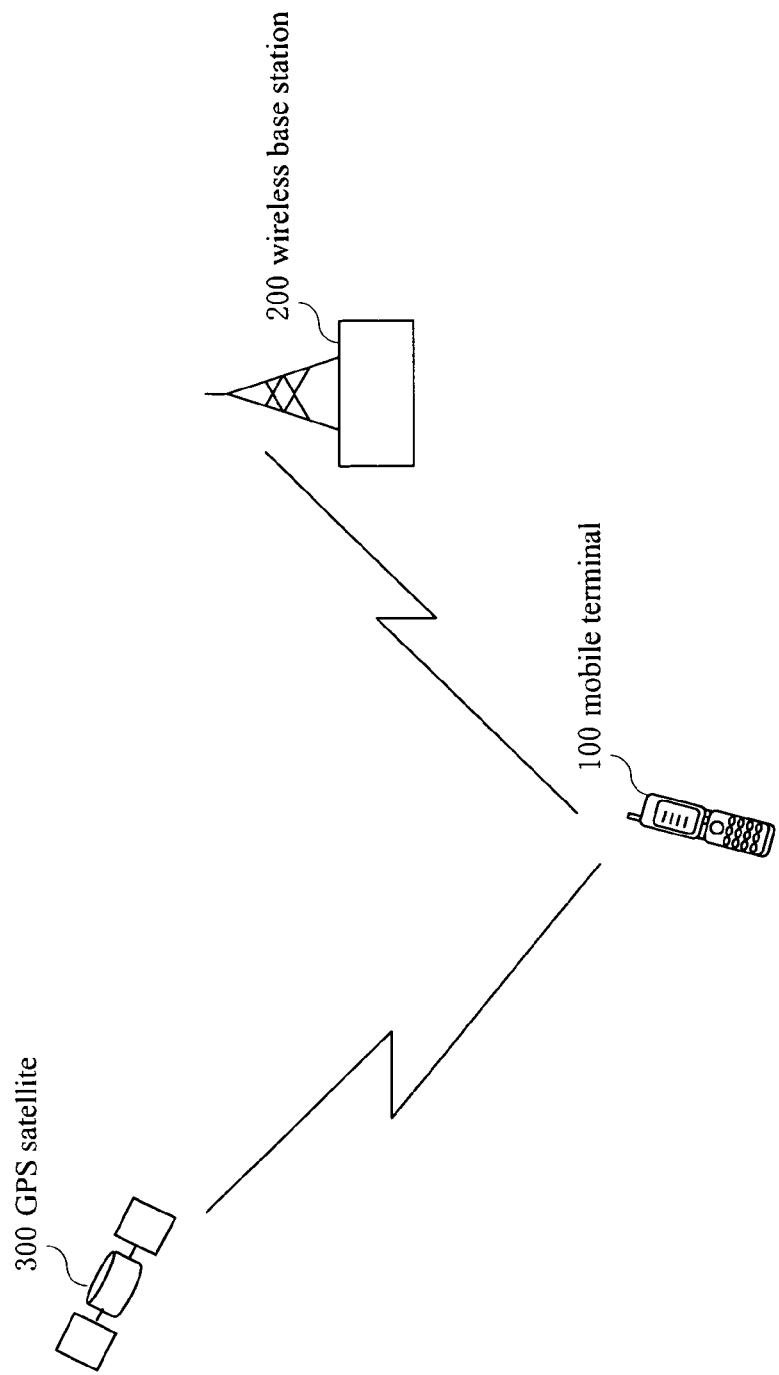
FIG. 1 is a diagram showing an exemplary embodiment of a communication system using the mobile terminal of the present invention.

Referring to FIG. 1, there is disclosed a system constituted by mobile terminal 100, wireless base station 200 and GPS satellite 300.

Wireless base station 200 is a general wireless base station which performs wireless communication (communicable) with mobile terminal 100.

GPS satellite 300 is an artificial satellite for acquiring position information used for a GPS (Global Positioning System).

Mobile terminal 100 is a mobile communication terminal which is provided with a communication function and which a user can carry.

Figure 2:
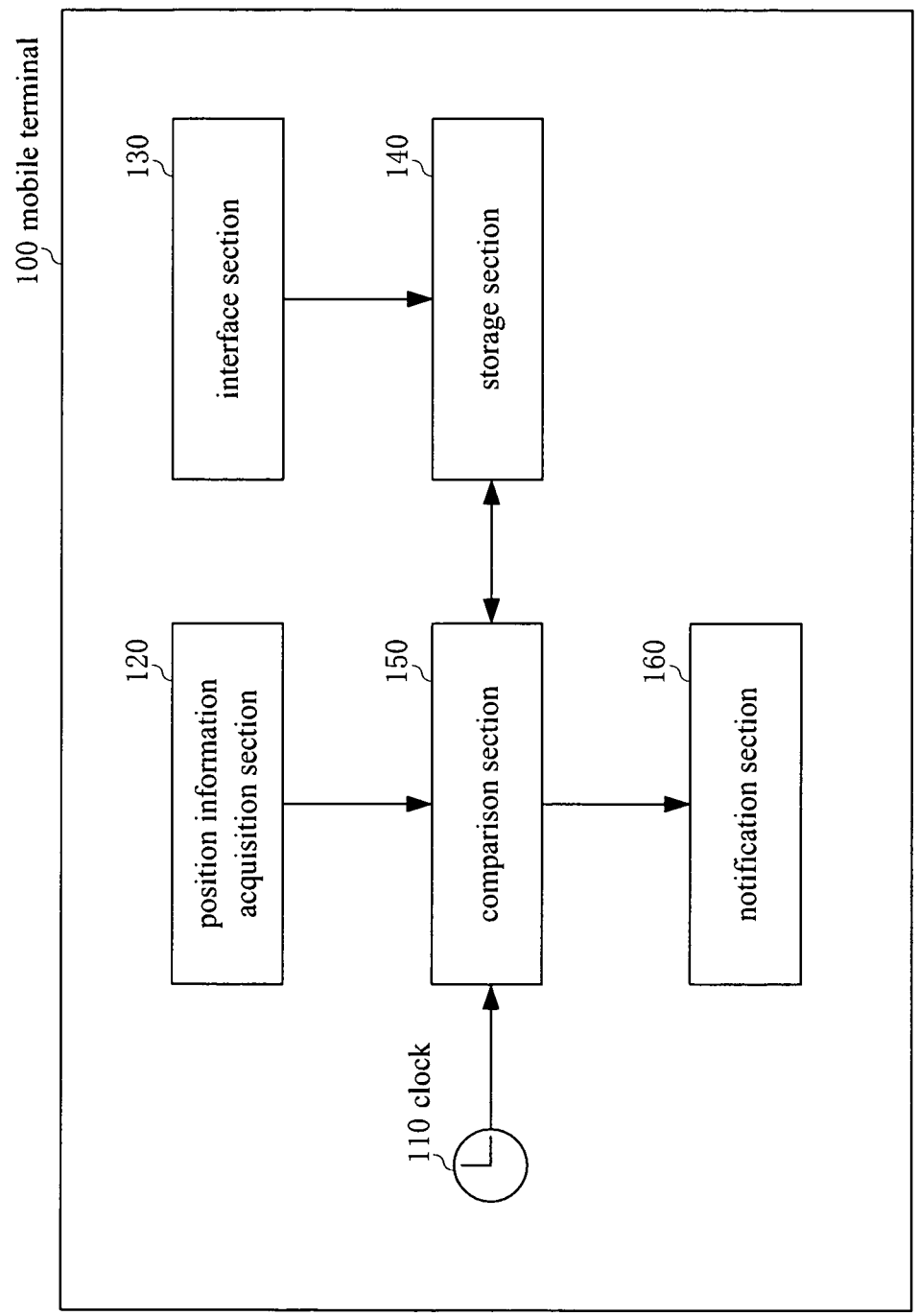
FIG. 2 is a diagram showing an example of the internal configuration of the mobile terminal shown in FIG. 1.

Mobile terminal 100 shown in FIG. 1 is provided with clock 110, position information acquisition section 120, interface section 130, storage section 140, comparison section 150 and notification section 160 as shown in FIG. 2. In FIG. 2, only the components that are related to the present invention are shown among the components mobile terminal 100 is provided with.

Clock 110 measures time and displays the current hour. Clock 110 may be a clock provided for a common mobile terminal.

Position information acquisition section 120 acquires position information indicating the position of mobile terminal 100 at a timing set in advance. In this case, position information acquisition section 120 may acquire the position information from GPS satellite 300 or from wireless base station 200. The case where position information acquisition section 120 acquires the position information from GPS satellite 300 will be described below as an example. The set timing may be a cyclic timing having a predetermined cycle or a timing based on a certain rule.

Interface section 130 is operated by the user who operates mobile terminal 100 to input information from the outside of mobile terminal 100. For example, interface section 130 may include button keys, a touch panel and the like provided for mobile terminal 100. Interface section 130 displays a screen for video, still images and the like. For example, interface section 130 may include a display and the like.

Storage section 140 stores hour information and position condition information inputted to interface section 130 in association with each other.

In storage section 140 shown in FIG. 2, the hour information and the position condition information are stored in association with each other as shown in FIG. 3. A number (No.) is given to each association. The position condition information is constituted by a latitude, a longitude, a distance range and inside/outside information associated with one another.

The latitude and the longitude are those generally used.

The distance range indicates a distance (for example, a radius) from a position indicated by the latitude and the longitude.

The inside/outside information is information indicating whether the position of the terminal is inside or outside of the area of the distance range.

How to use these pieces of information will be described later.

In the example shown in FIG. 3, three associations between the hour information and the position condition information can be stored, and two associations between the hour information and the position condition information are stored. The number of associations which can be stored in storage section 140 is not limited to three.

Hour information "6:30", a latitude "north latitude: ○○°○○'○○''", a longitude "east longitude: ΔΔ°ΔΔ'ΔΔ''" and a distance range "100 m" and inside/outside information "inside" are associated and stored as corresponding to the first (No. 1) association. Hour information "7:00", a latitude "north latitude: □□°□□'□□''", a longitude "east longitude: xx°xx'xx''" and the distance range "100 m" and the inside/outside information "inside" are associated and stored as corresponding to the second (No. 2) association. The third (No. 3) association is not stored (not registered).

Information indicating a day of the week, information indicating a specified date of every month, sound volume, the kind of sound and the like may be associated and stored although this is not shown in FIG. 3.

When the hour shown by clock 110 becomes the hour indicated by the hour information stored in storage section 140, comparison section 150 compares the position condition information stored in storage section 140 in association with the hour information and position information acquired by position information acquisition section 120. In this case, comparison section 150 uses the latest position information among position information acquired by position information acquisition section 120.

If the position information acquired by position information acquisition section 120 corresponds to the position condition information stored in storage section 140 as a result of the comparison by comparison section 150, notification section 160 causes a predetermined notification to be generated on the outside of mobile terminal 100. In this case, notification section 160 may give the notification by emitting a predetermined sound to the outside of mobile terminal 100. Notification section 160 may give the notification by causing interface section 130 to show a predetermined display. Notification section 160 may give the notification by generating a predetermined vibration (for example, a vibrator function).

Figure 4:
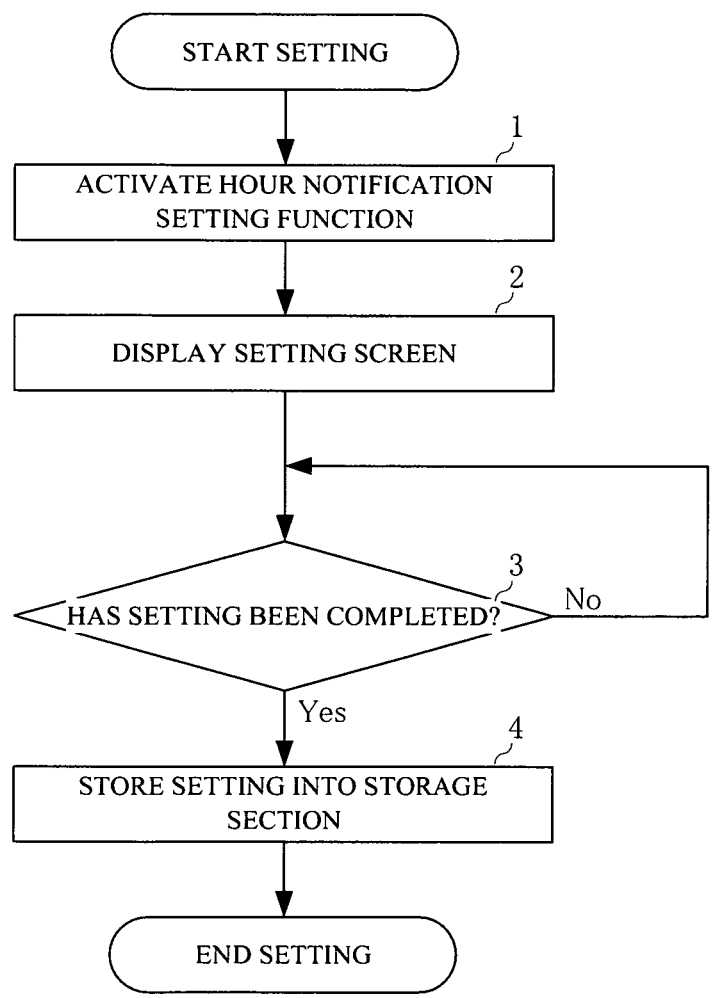
FIG. 4 is a flowchart for illustrating a setting method for performing hour notification in the mobile terminal shown in FIG. 1.

A setting method for notifying the hour by mobile terminal 100 shown in FIG. 1 will be described below with reference to FIG. 4.

First, an hour notification setting function is activated by a predetermined operation on mobile terminal 100 by the user at step 1; a setting screen for making settings is displayed on interface section 130 at step 2.

In this case, a generally used mechanism may be used to activate the hour notification setting function, and the mechanism is not especially specified here. For example, a list of menu items (a table of the menu items is possible, or icons dedicated for the menu items may be arranged in accordance with a predetermined rule) provided for mobile terminal 100 may be displayed on interface section 130 so that the user can select and activate a desired menu item by operating interface section 130.

Figure 5:
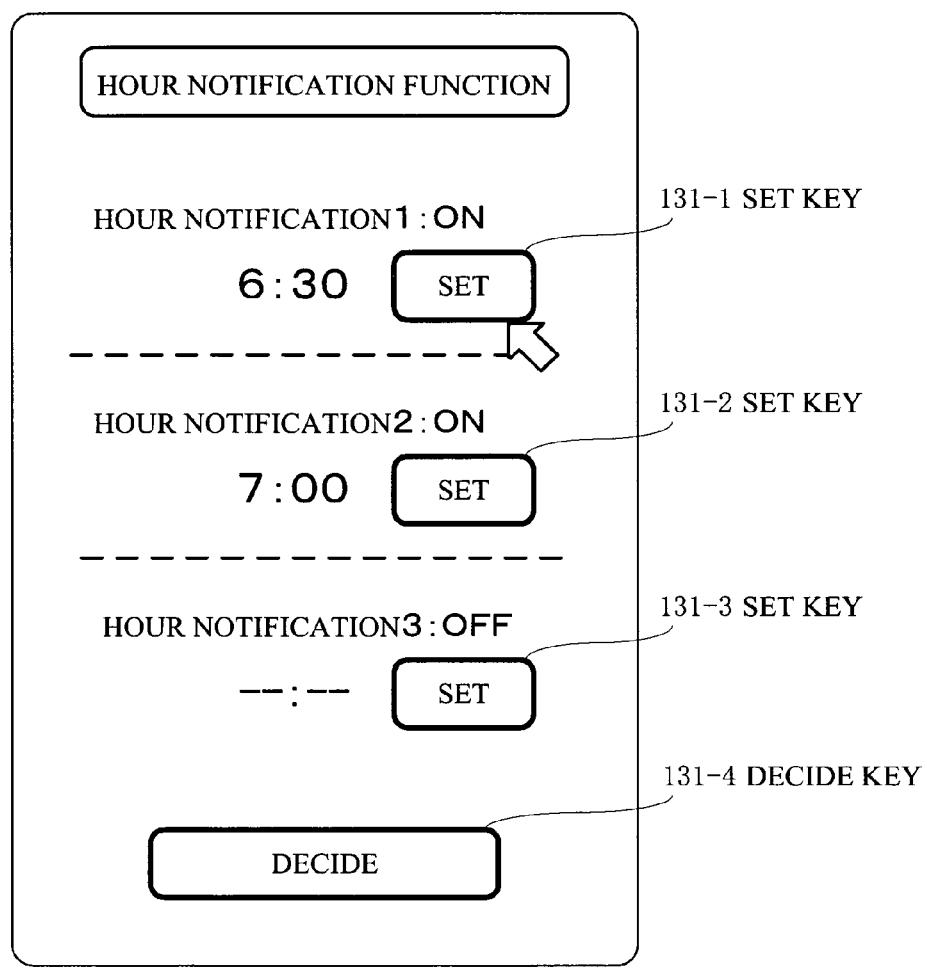
FIG. 5 is a diagram showing an example of a setting screen displayed on an interface section shown in FIG. 2 at step 2.

On interface section 130 shown in FIG. 2, a screen for setting the hour when an hour notification is to be given is displayed as shown in FIG. 5. In FIG. 5, the case where three hours (hour notifications 1 to 3) can be set for mobile terminal 100 is shown as an example. Currently, "6:30" and "7:00" are set for hour notification 1 and hour notification 2, respectively, and nothing is set for hour notification 3. The hour notifications 1 to 3 correspond to No. 1 to No. 3 shown in FIG. 3, respectively.

Set keys 131-1 to 131-3 for setting hour notifications 1 to 3, respectively, are displayed. There is also displayed Decide key 131-4 for deciding an hour notification set by selecting the hour notification after setting hours using Set keys 131-1 to 131-3.

For example, it is assumed that Set key 131-1 for hour notification 1 is selected by the user.

Figure 6:
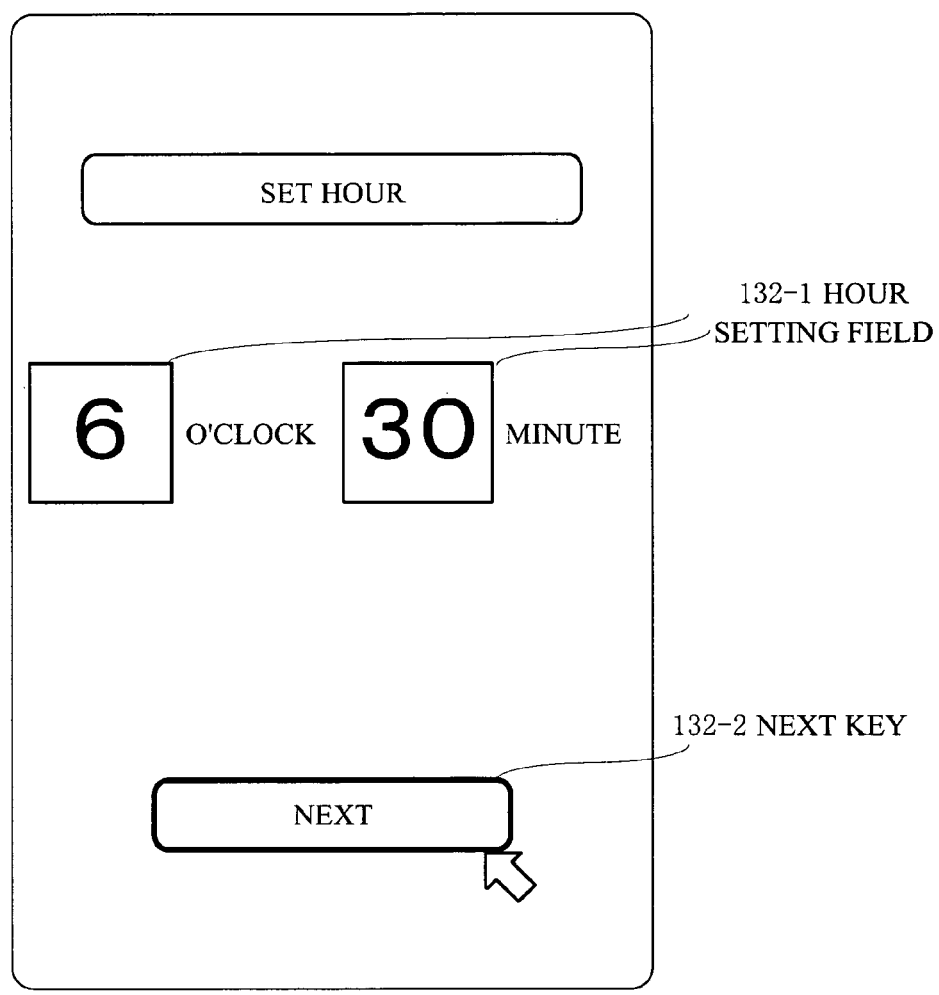
FIG. 6 is a diagram showing an example of a screen displayed on the interface section shown in FIG. 2 when a Set key shown in FIG. 5 is selected.

When Set key 131-1 shown in FIG. 5 is selected, a screen for setting the hour as shown in FIG. 6 is displayed on interface section 130. In this case, hour setting field 132-1 and Next key 132-2 are displayed on interface section 130.

Hour setting field 132-1 is a field for setting (inputting) the hour when a notification is to be given. In hour setting field 132-1, "o'clock" and "minute" can be separately inputted. When Next key 132-2 is selected after inputting desired "o'clock" and "minute", the screen transitions to the next setting screen.

Hour setting field 132-1 may be such that numerals can be directly inputted. Hour setting field 132-1 may be such that desired numerals may be selected from multiple numerals (for "o'clock" and "minute") with the use of a pull-down menu. That is, the display form and input form of hour setting field 132-1 are not especially specified, and any form may be used if a desired hour can be inputted.

Next key 132-2 is a key selected to proceed to the next setting screen. That is, when Next key 132-2 is selected by the user, the next setting screen is displayed on interface section 130. It is also conceivable that, when Next key 132-2 is selected in a state that nothing is set in hour setting field 132-1, the screen does not transition to the next setting screen (does not respond to the selection and does not change).

It is conceivable that, when Next key 132-2 is selected after the hour is set, for example, a screen for setting a day of the week is displayed as the next setting screen.

Figure 7:
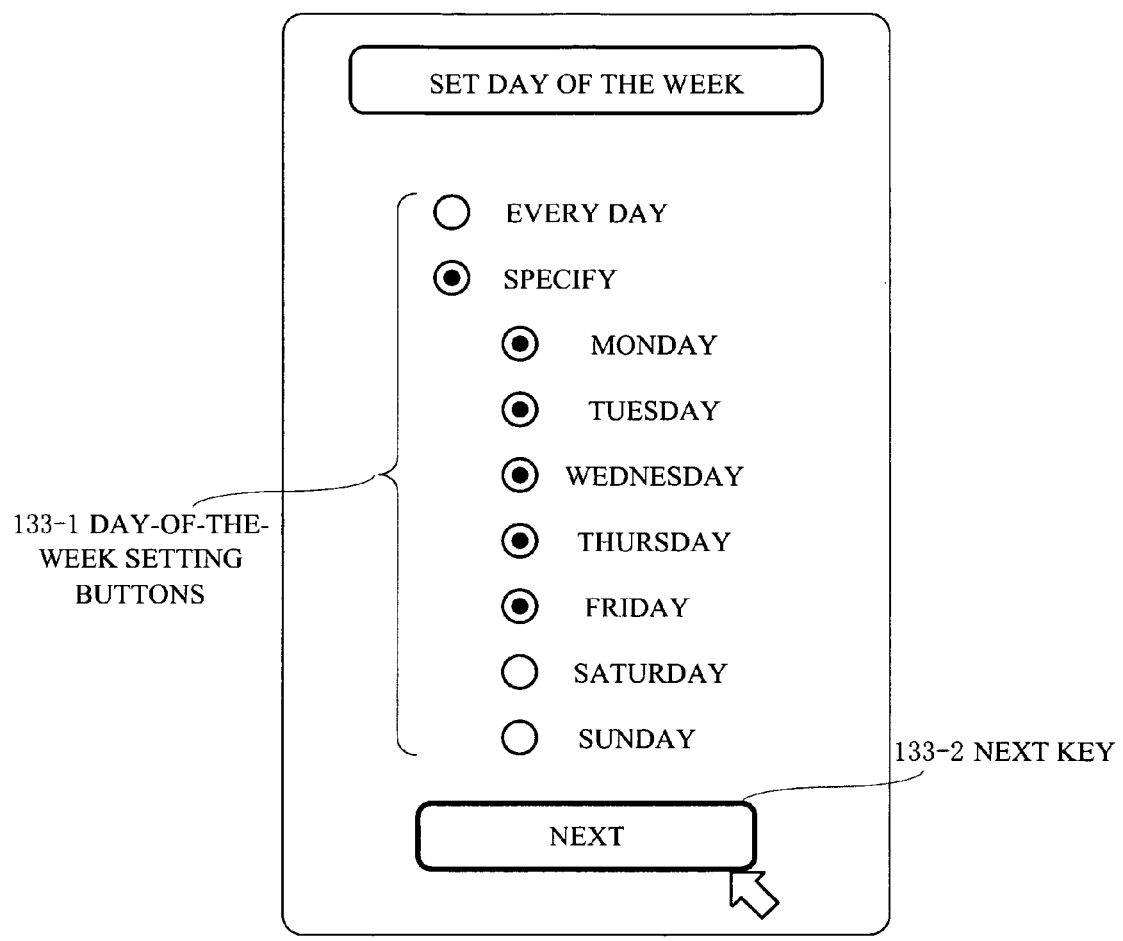
FIG. 7 is a diagram showing an example of a screen displayed on the interface section shown in FIG. 2 when a Next key shown in FIG. 6 is selected.

When Next key 132-2 shown in FIG. 6 is selected, a screen for setting a day of the week as shown in FIG. 7 is displayed on interface section 130. In this case, day-of-the-week setting buttons 133-1 for setting a day of the week and Next key 133-2 for proceeding to the next setting screen are displayed.

Day-of-the-week setting buttons 133-1 are buttons for setting a day of the week when the hour is to be notified.

For example, if an "every day" button is selected among day-of-the-week setting buttons 133-1 shown in FIG. 7, an hour notification process is performed irrespectively of the day of the week when it becomes the hour set on the screen shown in FIG. 6. If a "specify" button is selected among day-of-the-week setting buttons 133-1, and Monday, Tuesday, Wednesday, Thursday and Friday are selected, as in the example shown in FIG. 7, the hour notification process is performed when it becomes the hour set on the screen shown in FIG. 6 on a weekday. Such settings are used in an hour notification function provided for a common mobile terminal.

FIG. 7 shows the case where day-of-the-week setting buttons 133-1 are radio buttons, as an example. However, the display form and input form of day-of-the-week setting buttons 133-1 are not especially specified, and any form may be used if a day of the week can be selected. For example, day-of-the-week setting buttons 133-1 may be such that a day of the week can be directly inputted. Check boxes may be provided for days of the week so that a desired day of the week can be selected.

Next key 133-2 is a key which is selected to proceed to the next setting screen. That is, when Next key 133-2 is selected by the user, the next setting screen is displayed on interface section 130. It is also conceivable that, when Next key 133-2 is selected in a state in which none of day-of-the-week setting buttons 133-1 is selected, the screen does not transition to the next setting screen (does not respond to the selection and does not change).

It is conceivable that, when Next key 133-2 is selected after a day of the week is set, for example, a screen for setting position conditions is displayed as the next setting screen.

Figure 8:
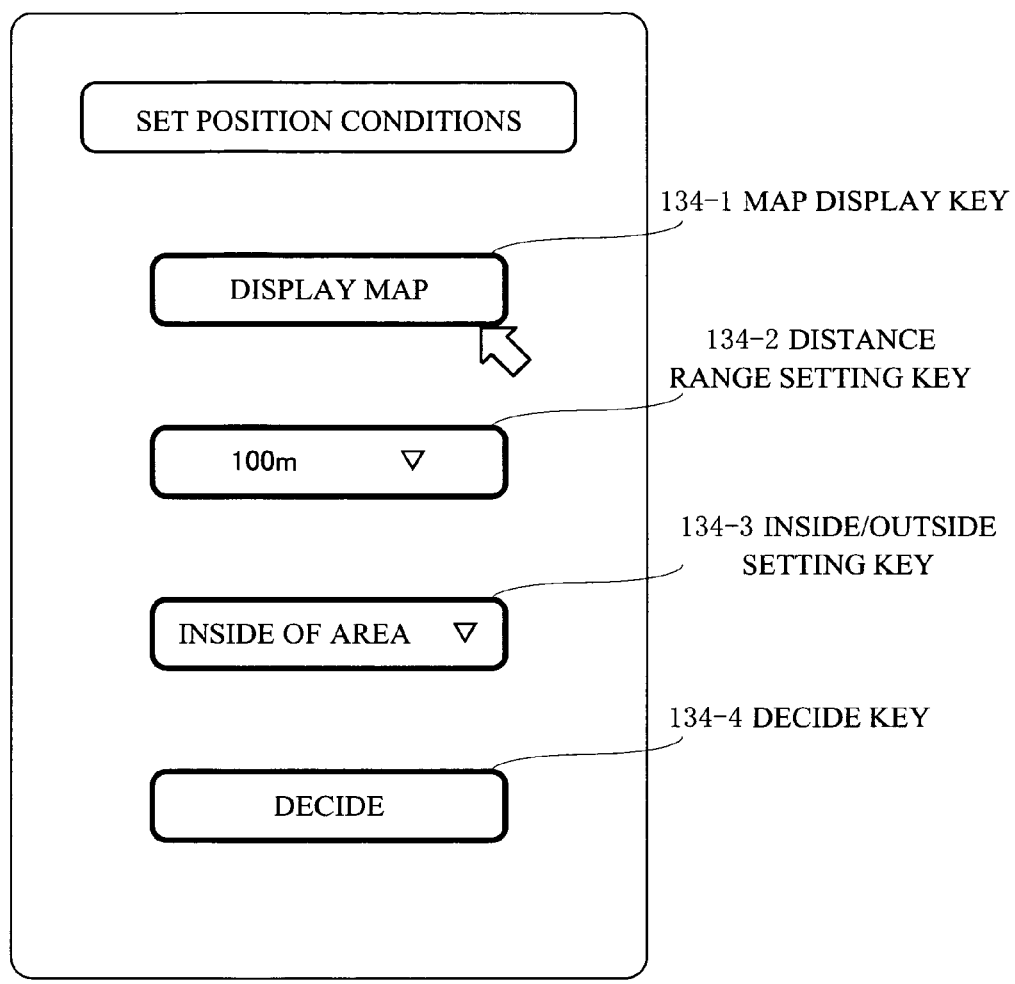
FIG. 8 is a diagram showing an example of a screen displayed on the interface section shown in FIG. 2 when a Next key shown in FIG. 7 is selected.

When Next key 133-2 shown in FIG. 7 is selected, a screen for setting position conditions as shown in FIG. 8 is displayed on interface section 130. In this case, Map display key 134-1, Distance range setting key 134-2, Inside/outside setting key 134-3 and Decide key 134-4 are displayed on interface section 130.

Map display key 134-1 is a key for causing interface section 130 to display a map.

Distance range setting key 134-2 is a key for setting a distance range.

Inside/outside setting key 134-3 is a key for setting whether the position of the terminal is inside or outside of the area of the distance range.

Decide key 134-4 is a key for deciding position conditions which have been set.

First, description will be made on a process performed when Map display key 134-1 is selected by the user.

When Map display key 134-1 is selected by the user, a map is displayed on interface section 130.

Figure 9:
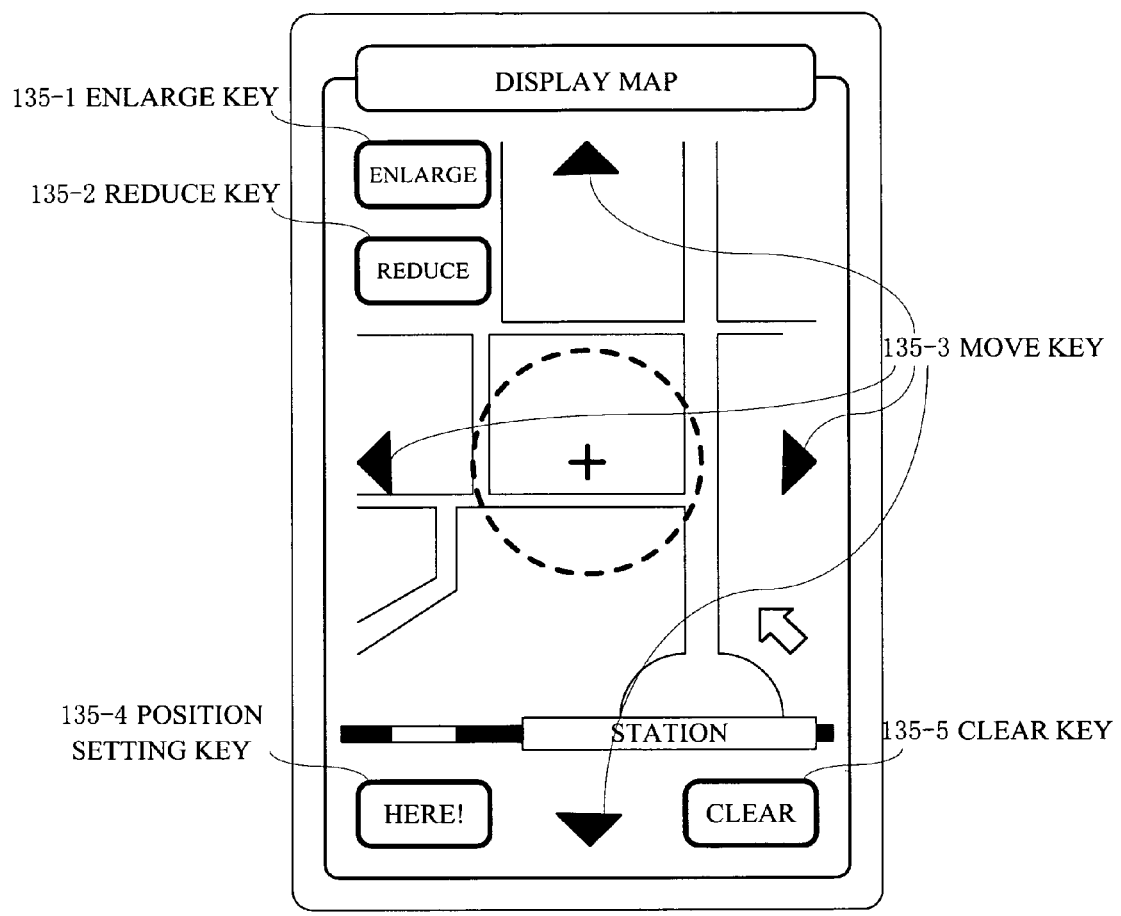
FIG. 9 is a diagram showing an example of a screen on which a map is displayed on the interface section shown in FIG. 2 when a Map display key shown in FIG. 8 is selected by a user.

The map is displayed on interface section 130 as shown in FIG. 9. In this case, Enlarge key 135-1, Reduce key 135-2, Move keys 135-3, Position setting key 135-4 and Clear key 135-5 are displayed together with the map.

Maps displayed on interface section 130 are those that mobile terminal 100 has acquired from map delivery sites or those that have been stored in storage section 140 of mobile terminal 100 in advance.

Enlarge key 135-1 is a key for enlarging a displayed map. When Enlarge key 135-1 is selected by the user, the displayed map is displayed being enlarged by magnification set in advance.

Reduce key 135-2 is a key for reducing a displayed map. When Reduce key 135-2 is selected by the user, the displayed map is displayed being reduced by magnification set in advance.

Move keys 135-3 are keys for moving a displayed map. That is, Move keys 135-3 are keys for moving the range of the map to be displayed on interface section 130. In FIG. 9, Move keys 135-3 are displayed as triangle arrows near the four sides of the displayed map. However, the display method and the display form are not especially limited.

When Move key 135-3 displayed on the right side of the map is selected by the user, the displayed map moves to the right direction by a predetermined distance. When Move key 135-3 displayed on the left side of the map is selected by the user, the displayed map moves to the left direction by a predetermined distance. When Move key 135-3 displayed on the upper side of the map is selected by the user, the displayed map moves upward by a predetermined distance. When Move key 135-3 displayed on the lower side of the map is selected by the user, the displayed map moves downward by a predetermined distance. The description has been made on the assumption that the move directions (positions of Move keys 135-3) are up and down, and right and left directions. When the map is displayed with the north direction set at the upper side, the upper side, the lower side, the right side and the left side are the north side, the south side, the east side and the west side, respectively.

Position setting key 135-4 is a key for setting a position to be a reference point of hour notification.

A cross-shaped mark (hereinafter referred to as a cross mark) is shown on the map shown in FIG. 9. This is the reference point of hour notification. A cursor (displayed in an arrow shape in FIG. 9) displayed on the map on interface section 130 may be used to move the cross mark. Other methods (for example, a method in which the cross mark is fixed at the center of the screen, and a desired position is moved to the center of the screen by moving a displayed map with Move key 135-3) may be used to move the cross mark. When the user selects Position setting key 135-4 after moving to the desired position, the reference point of hour notification is decided. Such means that enables the distance range from the reference point to be set like the broken-line circle shown in FIG. 9 is also possible. In this case, the distance range is changed by the user changing the size of the circle using the cursor or the like.

Clear key 135-5 is a key for clearing the contents set on the displayed map. When Clear key 135-5 is selected by the user, the enlarged/reduced display shown with Enlarge key 135-1 or Reduce key 135-2, movement of the map performed with Move keys 135-3 or decision of the reference point performed with the cross mark and Position setting key 135-4 is cleared.

When Position setting key 135-4 is selected by the user, the screen displayed on interface section 130 returns to the screen shown in FIG. 8.

Then, when Distance range setting key 134-2 shown in FIG. 8 is selected by the user, a screen for setting a distance range is displayed on interface section 130.

Figure 10:
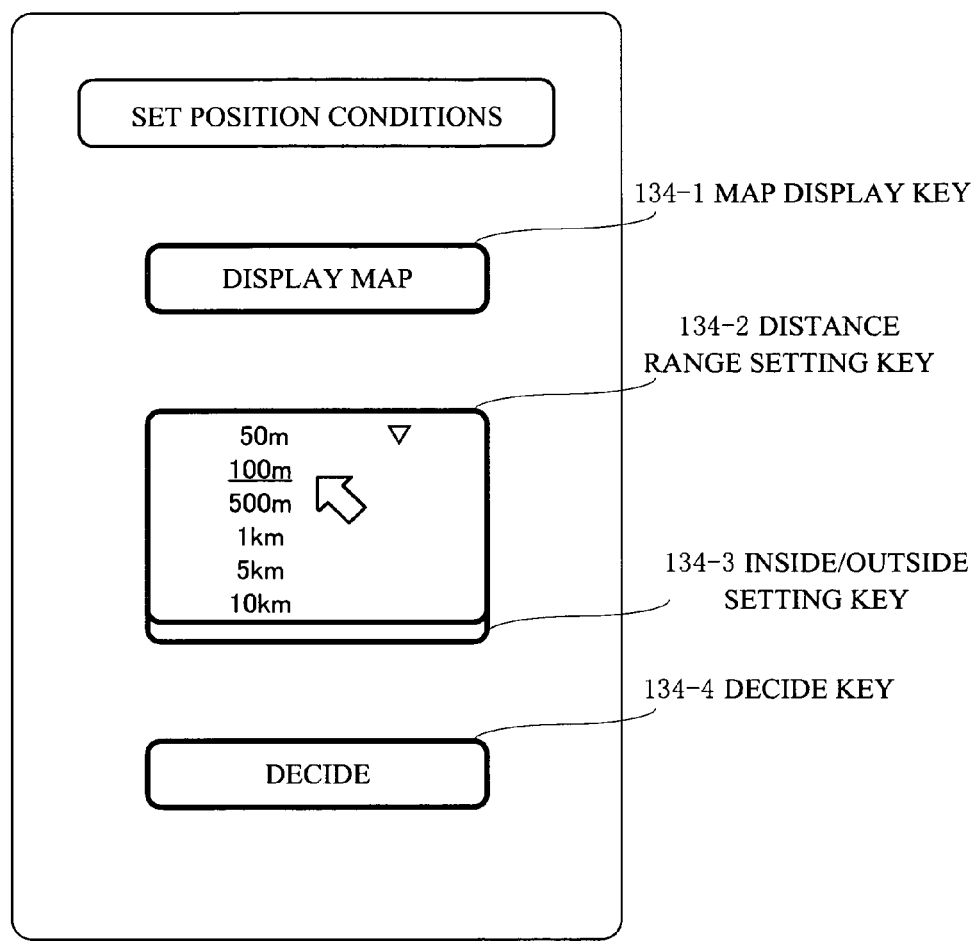
FIG. 10 is a diagram showing an example of a screen for setting a distance range which is displayed on the interface section shown in FIG. 2 when a Distance range setting key shown in FIG. 8 is selected by the user.

When Distance range setting key 134-2 shown in FIG. 8 is selected, Distance range setting key 134-2 is displayed as a pull-down menu as shown in FIG. 10 so that the user can set a desired distance range.

For example, "50 m", "100 m", "500 m", "1 km", "5 km" and "10 km" may be displayed as the pull-down menu, as shown in FIG. 10. In this case, the user can move the cursor and select (set) a desired distance range from the pull-down menu by operating interface section 130. The example shown in FIG. 10 shows the case where "100 m" is selected.

When the distance range is selected (set) by the user, the screen displayed on interface section 130 returns to the screen shown in FIG. 8.

Next, when Inside/outside setting key 134-3 shown in FIG. 8 is selected by the user, a screen for setting whether the position of the terminal is inside or outside of the area of the distance range is displayed on interface section 130.

Figure 11:
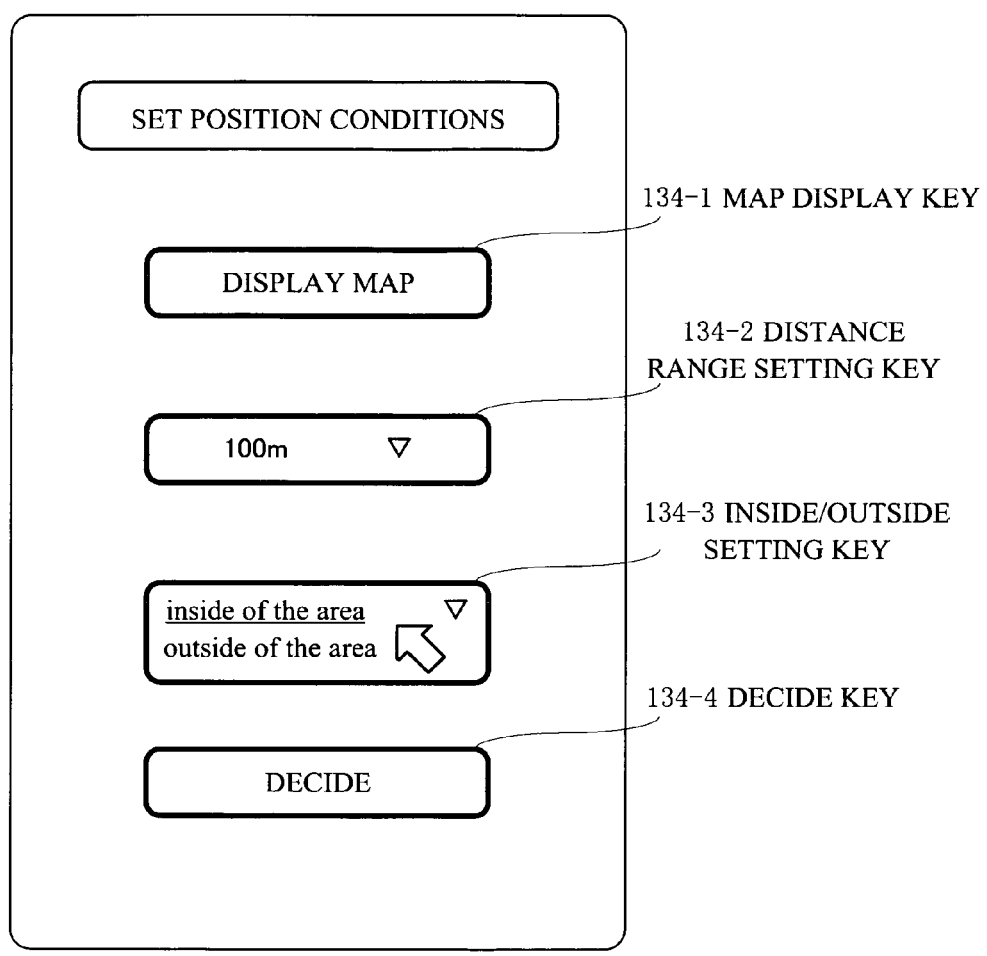
FIG. 11 is a diagram showing an example of a screen for setting whether the position of the terminal is inside of the area or outside of the area of the distance range, which is displayed on the interface section shown in FIG. 2 when an Inside/outside setting key shown in FIG. 8 is selected by the user.

When Inside/outside setting key 134-3 shown in FIG. 8 is selected, Inside/outside setting key 134-3 is displayed as a pull-down menu as shown in FIG. 11 so that the user can set whether the target of hour notification is to be inside or outside of the area set by Distance range setting key 134-2.

For example, "inside of area" and "outside of area" may be displayed as the pull-down menu, as shown in FIG. 11. In this case, the user can move the cursor and select (set) any of them from the pull-down menu by operating interface section 130. The example shown in FIG. 11 shows the case where "inside of area" is selected.

When the selection with Inside/outside setting key 134-3 is completed by the user, the screen displayed on interface section 130 returns to the screen shown in FIG. 8.

The case where settings are made by using Map display key 134-1, Distance range setting key 134-2 and Inside/outside setting key 134-3 in that order has been described as an example. However, the setting order is not especially limited.

Next, when Decide key 134-4 is selected, the contents described above are decided, and it is judged at step 3 that all the settings have been completed. The set contents are stored into storage section 140 at step 4. Specifically, the storage is performed as follows.

The hour set on the screen shown in FIG. 6 is set as the hour information shown in FIG. 3. The reference point set on the screen shown in FIG. 9 is stored as the latitude and the longitude in FIG. 3. The distance range set on the screen shown in FIG. 10 is stored as the distance range shown in FIG. 3. The inside/outside information set on the screen shown in FIG. 11 is stored as the inside/outside information shown in FIG. 3.

If the contents described with reference to FIGS. 6 to 11 are set, the contents of No. 1 shown in FIG. 3 are stored in storage section 140.

Description has been made by showing an example of the hour notification setting screens in FIGS. 5 to 11. However, the setting screens are not limited to the example. Various setting screens (for example, GUI: Graphical User Interface) are conceivable. It goes without saying that, if the application to be activated for making settings is different, the displayed screens may be different. Any display means is possible if each of the settings can be made.

Figure 12:
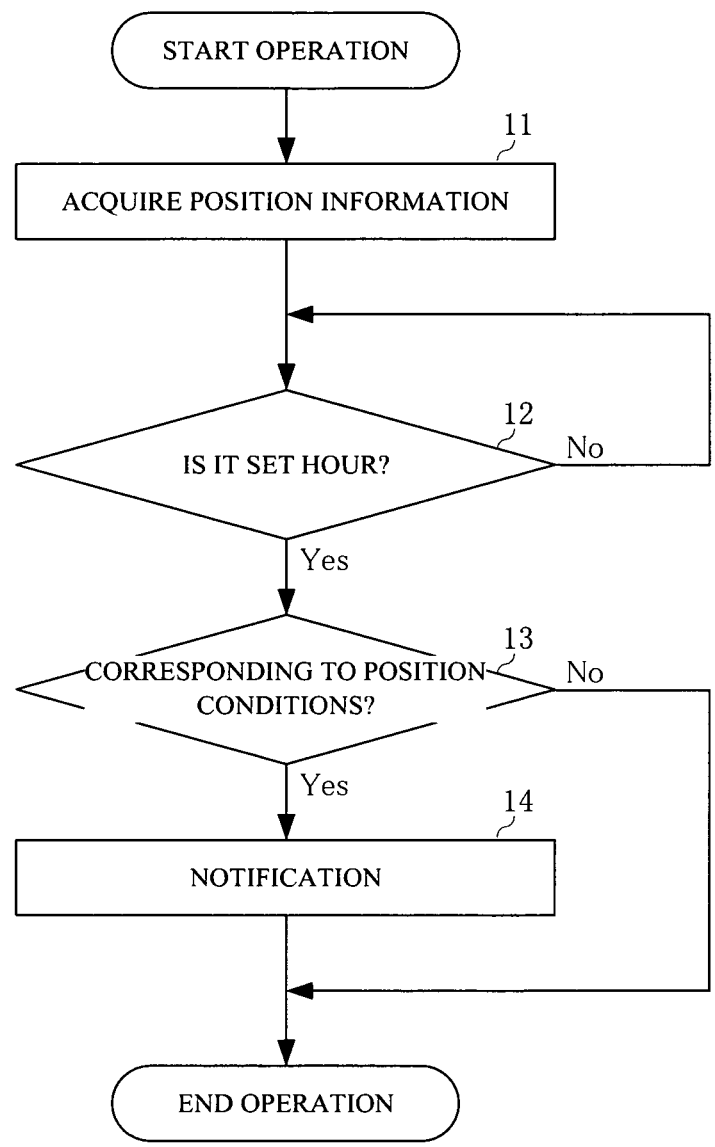
FIG. 12 is a flowchart for illustrating an hour notification method in this exemplary embodiment.

An hour notification method in this exemplary embodiment will be described below with reference to FIG. 12.

At step 11, position information acquisition section 120 of mobile terminal 100 acquires position information about mobile terminal 100 at a timing set in advance. As described before, this acquisition timing may be a cyclic timing having a predetermined cycle or a timing based on a certain rule.

At step 12, comparison section 150 compares the hour shown by clock 110 with the hour indicated by hour information stored in storage section 140 (the hour information shown in FIG. 3) to confirm whether they agree with each other.

If the hour shown by clock 110 becomes the hour indicated by the hour information stored in storage section 140, comparison section 150 compares position condition information stored in storage section 140 in association with the hour information, with position information acquired by position information acquisition section 120 at step 13. Specifically it is judged whether the position information acquired by position information acquisition section 120 corresponds to the position condition information stored in storage section 140.

For example, in the case where the associations shown in FIG. 3 are stored in storage section 140, if the position information about mobile terminal 100 acquired by position information acquisition section 120 indicates a position within a range of 100 m from the position with a north latitude of ○○°○○'○○" and an eastern longitude of ΔΔ°ΔΔ'ΔΔ" at 6:30, then the acquired position information corresponds to the position condition information of No. 1. If the position information about mobile terminal 100 acquired by position information acquisition section 120 indicates a position within a range of 100 m from the position with a north latitude of □□°□□'□□" and an eastern longitude of xx°xx'xx" at 7:00, then the acquired position information corresponds to the position condition information of No. 2.

As the position information used for the comparison here, the latest position information among position information acquired by position information acquisition section 120 is used.

Figure 13:
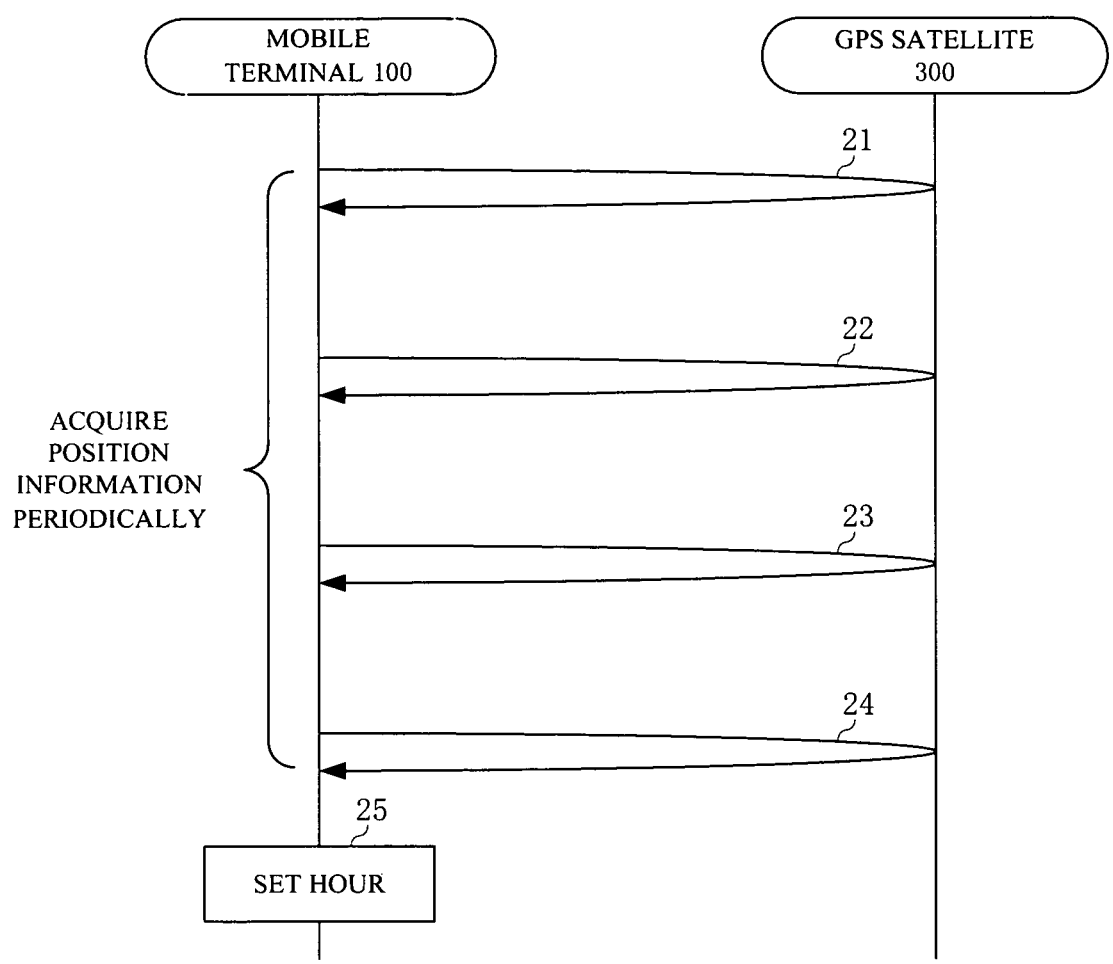
FIG. 13 is a sequence diagram for illustrating an example of position information used for comparison at step 13.

An example of the position information used for the comparison at step 13 will be described with reference to FIG. 13.

As described before, the position information about mobile terminal 100 is acquired by position information acquisition section 120 from GPS satellite 300 periodically (steps 21 to 24).

When the current hour shown by clock 110 becomes the set hour stored in storage section 140 at step 25, the position information used for comparison at step 13 is the position information acquired at step 24, which is the latest position information.

Figure 14:
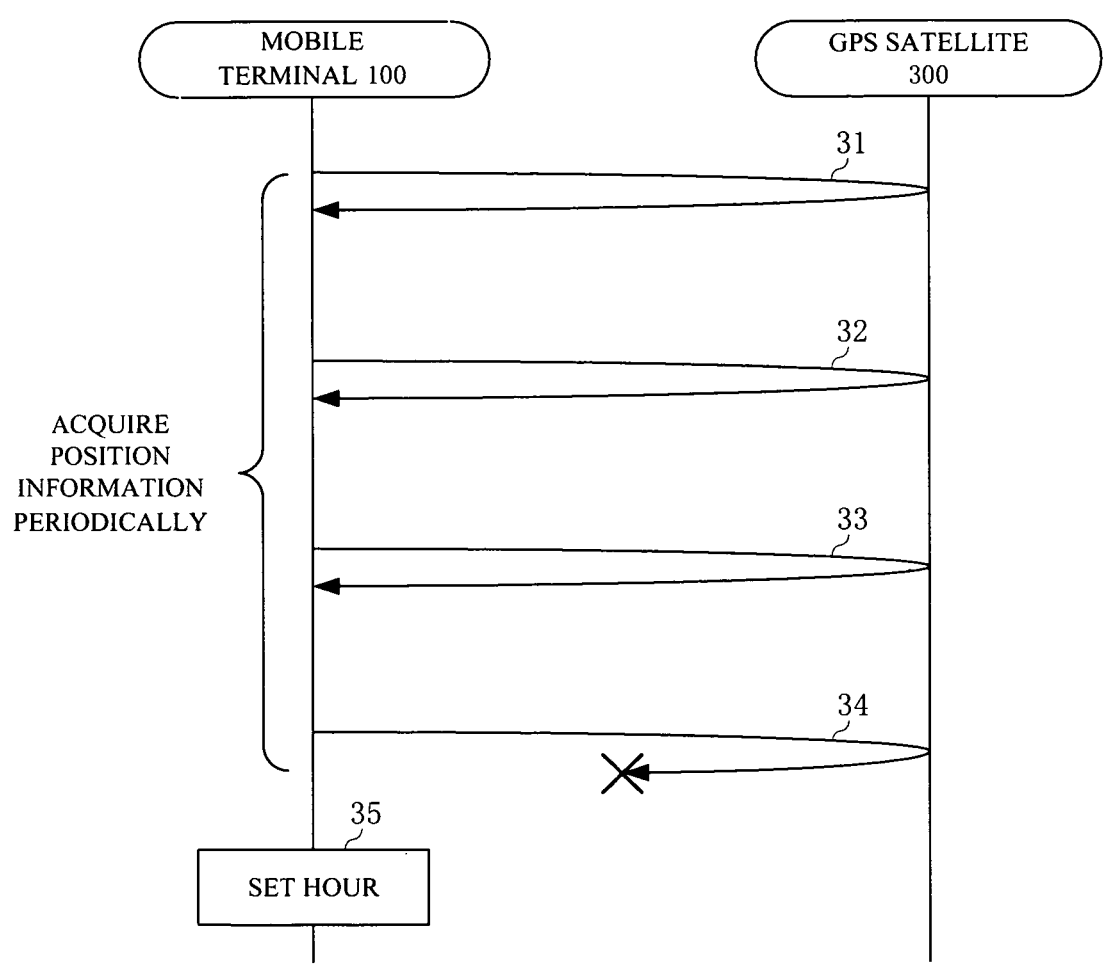
FIG. 14 is a sequence diagram for illustrating another example of the position information used for the comparison at step 13.

Another example of the position information used for the comparison at step 13 will be described with reference to FIG. 14.

As described before, the position information about mobile terminal 100 is acquired by position information acquisition section 120 from GPS satellite 300 periodically (steps 31 to 34). Here, it is assumed that the position information cannot be acquired for some reason at step 34.

After that, when the current hour shown by clock 110 becomes the set hour stored in storage section 140 at step 35, the position information used for comparison at step 13 is the position information acquired at step 33, which is the latest position information among position information which could be acquired.

Then, if it is judged that the position information acquired by position information acquisition section 120 corresponds to the position condition information stored in storage section 140, notification section 160 gives a predetermined notification at step 14. This notification may be given by emitting a predetermined sound on the outside of mobile terminal 100, as described before. This notification may be given by showing a predetermined display on interface section 130. This notification may be given by emitting a predetermined vibration. This notification may be such that a snooze function, sound volume, or the kind of sound or display may be selected.

Position information acquisition section 120 may acquire the position information at a timing having a predetermined cycle. In addition thereto, position information acquisition section 120 may acquire the position information at an hour which is earlier, by a predetermined time, than the hour that is indicated by the hour information stored in storage section 140, as the position information acquisition timing. For example, if the hour information stored in storage section 140 indicates "7:00", position information acquisition section 120 may acquire the position information at "6:59", one minute earlier than "7:00". In this case, the "earlier hour" may be set on the basis of the time required for the process of acquisition of the past position information acquired by position information acquisition section 120 or on the basis on which position information acquisition section 120 acquires the position information from wireless base station 200 and GPS satellite 300.

Position information acquisition section 120 may change the timing of acquiring the position information on the basis of the distance range stored in storage section 140. For example, the longer the timing interval that may be set by position information acquisition section 120, the longer is the distance range that is stored in storage section 140. The longer that the timing interval may be set, the longer is the time between the current hour at the time of setting and the hour indicated by the set hour information. The longer that the timing interval may be set, the longer will be the distance between the position indicated by the set position condition information and the current position at the time of setting.

As described above, setting of the hour and a position is enabled, and notification is given only when mobile terminal 100 exists at the set position when it becomes the set hour. Thereby, it is possible to perform more appropriate hour notification.

For example, if the setting of No. 1 shown in FIG. 3 (the user usually gets up at 6:30, and the position of his house is indicated by the north latitude of ○○°○○'○○" and the east longitude of ΔΔ°ΔΔ'ΔΔ") is made, a notification will not be given at 6:30 at a place which is not covered by the position conditions during travel or the like. Thereby, it is possible to avoid being awakened by mobile terminal 100 at 6:30 during travel or the like, without changing the hour notification setting.

The processes performed by the components provided for mobile terminal 100 described above may be performed by logical circuits prepared for the respective purposes. It is also possible to record a program in which the contents of the processes are described as procedures onto a recording medium which can be read by mobile terminal 100, to cause the program recorded on the recording medium to be read into mobile terminal 100 and to execute the program. The recording medium which can be read by mobile terminal 100 refers to a memory, such as a ROM and a RAM, an HDD or the like included in mobile terminal 100, in addition to a removable recording medium, such as a Floppy™ disk, a magneto-optical disk, a DVD and a CD. The program recorded on the recording medium is read into a CPU (not shown) provided for mobile terminal 100, and processes similar to those described above are performed under the control of the CPU. Here, the CPU operates as a computer which executes the program read from the recording medium on which the program is recorded.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A mobile terminal provided with a clock, the mobile terminal comprising:
   a position information acquisition section that acquires position information indicating a position of the mobile terminal at a predetermined timing;
   an interface section that inputs information from an outside of the mobile terminal;
   a storage section that stores hour information and position condition information inputted to the interface section in association with each other;
   a comparison section that compares, when the hour shown by the clock becomes the hour indicated by the hour information stored in the storage section, the position condition information stored in the storage section in association with the hour information, with the position information acquired by the position information acquisition section; and
   a notification section that causes a predetermined notification to be generated on the outside of the mobile terminal if the position information corresponds to the position condition information as a result of the comparison by the comparison section,
   wherein the storage section stores a latitude, a longitude, and a distance range from a position indicated by the latitude and the longitude, in association with one another as the position condition information, and
   wherein the position information acquisition section setting a longer timing interval, the larger the distance range being stored in the storage section.

2. The mobile terminal according to claim 1, wherein the storage section stores the latitude, the longitude, the distance range, and inside/outside information indicating whether the position of the terminal is inside or outside of the area of the distance range, in association with one another as the position condition information.

3. The mobile terminal according to claim 1, wherein the comparison section uses the latest position information among the position information acquired by the position information acquisition section when performing the comparison.

4. The mobile terminal according to claim 1, wherein the position information acquisition section acquires the position information at the hour which is earlier, by a predetermined time, than the hour indicated by the hour information stored in the storage section.

5. The mobile terminal according to claim 4, wherein the position information acquisition section sets the earlier hour on the basis of time required for a process of acquisition of the past position information acquired by the position information acquisition section or on the basis on which of a wireless base station communicable with the mobile terminal and a GPS is to be used to acquire the position information.

6. The mobile terminal according to claim 4, wherein the position information acquisition section acquires the position information using a wireless base station communicable with the mobile terminal or a GPS and sets the earlier hour, which includes a predetermined time corresponding to each of the wireless base station and the GPS, on the basis on which the wireless base station and the GPS is to be used to acquire the position information.

7. The mobile terminal according to claim 1, wherein the notification section gives the notification by any one of: emitting a predetermined sound on the outside of the mobile terminal, causing the interface section to show a predetermined display, and generating a predetermined vibration.

8. The mobile terminal according to claim 1, wherein the position information acquisition section changes the timing of acquiring the position information on the basis of time between the current hour at the time of setting and the hour indicated by the set hour information, or distance between a position indicated by the set position condition information and the current position at the time of the setting.

9. The mobile terminal according to claim 8, wherein the position information acquisition section setting the longer timing interval, the longer the time between the current hour at the time of setting and the hour indicated by the set hour information, or the larger the distance between the position indicated by the set position condition information and the current position at the time of the setting.

10. An hour notification method for causing notification, that the hour that has been set in advance has been reached, to be generated on an outside of a mobile terminal, the method comprising:
    measuring time;
    acquiring position information indicating the position of the mobile terminal at a predetermined timing;
    storing hour information and the position condition information inputted from the outside of the mobile terminal in association with each other;
    comparing, when the current hour becomes the hour indicated by the stored hour information, the position condition information stored in association with the hour information, with the acquired position information;
    causing a predetermined notification to be generated on the outside of the mobile terminal if the position information corresponds to the position condition information as a result of the comparison;
    storing a latitude, a longitude, and a distance range from a position indicated by the latitude and the longitude, in association with one another as the position condition information; and
    setting a longer timing interval, the larger the distance range being stored in the storage section.

11. The hour notification method according to claim 10, further comprising:
    storing the latitude, the longitude, the distance range, and inside/outside information indicating whether the position of the terminal is inside or outside of the area of the distance range, in association with one another as the position condition information.

12. The hour notification method according to claim 10, further comprising:
    using the latest position information among the acquired position information when performing the comparison.

13. The hour notification method according to claim 10, further comprising:
    acquiring the position information at an hour which is earlier, by a predetermined time, than the hour indicated by the hour information stored in the storage section.

14. The hour notification method according to claim 13, further comprising:

setting the earlier hour on the basis of time required for a process of acquisition of the acquired past position information or on the basis on which a wireless base station communicable with the mobile terminal and a GPS is to be used to acquire the position information.

15. The hour notification method according to claim 13, further comprising:
acquiring the position information using a wireless base station communicable with the mobile terminal or a GPS; and
setting the earlier hour, which is predetermined time corresponding to each of the wireless base station and the GPS, on the basis on which the wireless base station and the GPS is to be used for the acquisition of the position information.

16. The hour notification method according to claim 10, further comprising:
changing the timing of acquiring the position information on the basis of time between the current hour at the time of setting and the hour indicated by the set hour information, or on the basis of distance between a position indicated by the set position condition information and the current position at the time of the setting.

17. The hour notification method according to claim 16, comprising:
setting the longer timing interval, the longer the time between the current hour at the time of setting and the hour indicated by the set hour information, or the larger the distance between the position indicated by the set position condition information and the current position at the time of the setting.

18. A non-transitory computer readable storage medium in which there is recorded a program to be executed by a computer, the program being for executing:
a procedure for measuring time;
a procedure for acquiring position information indicating the position of the computer at a predetermined timing;
a procedure for storing hour information and the position condition information inputted from an outside of the computer in association with each other;
a procedure for comparing, when the current hour becomes the hour indicated by the stored hour information, the position condition information stored in association with the hour information, with the acquired position information;
a procedure for causing a predetermined notification to be generated on the outside of the computer if the position information corresponds to the position condition information as a result of the comparison;
a procedure for storing a latitude, a longitude, and a distance range from a position indicated by the latitude and the longitude, in association with one another as the position condition information; and
a procedure for setting a longer timing interval, the larger the distance range being stored in the storage section.

19. The non-transitory computer readable storage medium according to claim 18, wherein there is recorded a program for executing:
a procedure for storing the latitude, the longitude, the distance range, and inside/outside information indicating whether the position of the terminal is inside or outside of the area of the distance range, in association with one another as the position condition information.

20. The non-transitory computer readable storage medium according to claim 18, wherein there is recorded a program for executing:
a procedure for using the latest position information from among the acquired position information when performing the comparison.

21. The non-transitory computer readable storage medium according to claim 18, wherein there is recorded a program for executing:
a procedure for acquiring the position information at the hour a predetermined time earlier than the hour indicated by the stored hour information.

22. The non-transitory computer readable storage medium according to claim 21, wherein there is recorded a program for executing:
a procedure for setting the earlier hour on the basis of time required for a process of acquisition of the acquired past position information or on the basis of which of a wireless base station communicable with the computer and a GPS is to be used to acquire the position information.

23. The non-transitory computer readable storage medium according to claim 21, wherein there is recorded a program for executing:
a procedure for acquiring the position information using a wireless base station communicable with the computer or a GPS; and
a procedure for setting the earlier hour, which is predetermined time corresponding to the wireless base station and the GPS, on the basis on which the wireless base station and the GPS is to be used for the acquisition of the position information.

24. The non-transitory computer readable storage medium according to claim 18, wherein there is recorded a program for executing:
a procedure for changing the timing of acquiring the position information on the basis of time between the current hour at the time of setting and the hour indicated by the set hour information, or on the basis of distance between a position indicated by the set position condition information and the current position at the time of the setting.

25. The non-transitory computer readable storage medium according to claim 24, wherein there is recorded a program for executing:
a procedure for setting the longer timing interval, the longer the time between the current hour at the time of setting and the hour indicated by the set hour information, or the larger the distance between the position indicated by the set position condition information and the current position at the time of the setting.

* * * * *